United States Patent Office 3,546,154
Patented Dec. 8, 1970

3,546,154
EMULSION POLYMERIZATION OF
VINYL COMPOUNDS
Jesse C. H. Hwa, Stamford, Conn., Paul Kraft, Yonkers, N.Y., and Sheldon F. Gelman, Danbury, Conn., assignors to Stauffer Chemical Company, New York, N.Y., a corporation of Delaware
No Drawing. Filed Sept. 27, 1966, Ser. No. 582,260
Int. Cl. C08f 1/13, 3/30, 15/30
U.S. Cl. 260—29.6     11 Claims

ABSTRACT OF THE DISCLOSURE

A process of polymerizing vinyl monomers or mixture of monomers in an aqueous medium as described herein. The polymerization of the vinyl monomer is carried out initially in the presence of a short chain surfactant which is added either in increments or continuously therein. The short chain surfactant is an ammonium or alkaline metal salt of an alkanoate or an alkyl sulfate or sulfonate containing between 5 and 9 carbon atoms. After the monomers have been polymerized to a predetermined amount, a second surfactant is added incrementally to the reaction system which surfactant is an ammonium or alkyl metal salt of an alkyl or alkalene sulfate or sulfonate containing at least 10 carbon atoms.

---

This invention relates to the emulsion polymerization of vinyl compounds. More particularly it concerns methods for stabilizing the aqueous polymer emulsion and for controlling the particle size of the vinyl polymer thus produced.

Emulsion polymerization is a well known technique, whereby a monomer such as a vinyl or vinylidene halide or ester of the general type

is emulsified in water using an emulsifying agent, generally a good soap, and is then polymerized by standard methods employing such polymerization catalysts and conditions of temperature, pressure and reaction time as are known per se for the particular monomer being reacted. Instead of one monomer, mixtures of monomers are often polymerized to obtain copolymers in lieu of homopolymers. Typical examples of monomers polymerized by this technique are the vinyl and vinylidene halides, i.e. the chlorides, fluorides, bromides and iodides; vinyl ketones; vinyl aromatic compounds like styrene; esters of alcohols with mono- and polybasic acids, e.g. vinyl acetate, methyl and ethyl acrylates, methyl and ethyl methacrylates; unsaturated ethers and amides such as cetyl vinyl ether, acrylamides and acrylonitriles.

The heart of this emulsion polymerization method is of course the choice of emulsifying agent whereby the monomer or mixture of monomers is made ready for polymerization by emulsifying it in the aqueous system. In most processes today, the emulsifiers are primarily water soluble surfactants. The hydrophilic group is usually an ionizing or polyethyleneoxy group while the hydrophobic group is usually a hydrocarbon chain. The hydrophilic group (e.g. sulfonate, carboxylate, sulfate) makes the surfactant soluble in water, while the hydrophobic group (hydrocarbon chain) migrates to the oil or monomer phase. Typical of such "good" soaps are long chain fatty acid-derived sulfates such as sodium lauryl sulfate. It has long been felt, as indicated by the literature, that when the hydrocarbon portion of the surfactant contains less than about 10 carbon atoms the compound no longer functions as a useful emulsifier in these polymerizations. It has been considered that impracticably large quantities of such "poor" soaps or surfactants, i.e. of less than 10 carbon atoms, would be required to reach the CMC level (critical micelle concentration). Thus an extremely slow rate of polymerization would be anticipated, since one would not get good monomer emulsion in the water phase.

Contrary to these findings and assumptions of the prior art, an emulsion polymerization process has now been devised which successfully employs a "poor" soap as the chief emulsifying agent and yet permits controlled polymerization at a rapid rate to obtain remarkably stable polyvinyl latices of very uniform polymer particle size.

This new process in its broader aspects comprises commingling the vinyl monomer or mixture of monomers with a polymerization initiator in an aqueous medium under the conditions of temperature, pressure, agitation and time normally employed in the emulsion polymerization of the particular monomer. To this system a short chain surfactant is added incrementally, either as two or more increments or as a continuous metered flow, i.e. infinite number of increments, preferably in 2 to 12 increments for small volume preparation and continuous for large volume production, while the polymerization reaction proceeds until a total of between about 0.2% and 2.0% by monomer weight has been charged. When the polymerization is at least about 20 percent completed and up to 100 percent completed, as determined by standard methods, a small quantity, i.e. from about 0.05 to about 0.50% by monomer weight of a good surfactant, that is one of the commercial soaps or 10 or more carbon chain, is added. This good surfactant may be added in one shot or preferably also in about two to four increments. Then the process is terminated and a very stable polymerization emulsion results. Emulsion stabilities of more than seven months have thus been obtained, whereas previously the life of such a polyvinyl latex has been limited to a maximum of two to three months. The particle size of the resin products is extremely uniform and can be controlled by this new process to ±0.1μ in the 0.2 to 1.6 micron range. Utilizing preferred conditions, for instance, substantially monodisperse latices in the 0.6—0.7μ range can be readily prepared.

The so-called "poor" soaps are preferably the alkali metal or ammonium alkyl sulfates, sulfonates and carboxylates containing from 5 to 9 carbon atoms in either branched or straight chain form. They have relatively high CMC values or none at all. The "good" soaps or surfactants are those generally employed as such in the prior art and have relatively low CMC values, e.g. less than 0.2% for sodium lauryl sulfate. They have at least 10 carbon atoms in their chains and preferably from 10 to 20. Illustrative of them also are the long chain alkyl sulfates and sulfonates as well as the aryl alkyl sulfonates and the diester sulfo succinates.

According to one preferred embodiment of the invention, polymerization of the vinyl monomer is initiated in the presence of a small amount of seed, i.e. preformed latex, utilizing conventional conditions for a seeded reaction. After about one-half to two hours of polymerization, incremental addition of the short chain emulsifying agent is begun, adding initially say from ⅙ to ½ of the total emulsifier quantity desired and repeating the additions at regular intervals until the reaction is at least about 20 percent completed. Then incremental addition of a standard "good" emulsifier is begun, first adding say between about ¼ to ½ of the total quantity of it desired and repeating the additions periodically until the planned degree of conversion has been reached.

According to another preferred embodiment of the invention, the initial increment of short chain emulsifying agent is charged at the beginning of the polymerization reaction and periodic additions are made thereafter at intervals of generally one-half to two hours. After the reaction has proceeded to between 75 percent and 100 percent of completion, enough of a long chain emulsifying agent is added all at once to reduce the surface tension of the system from about 45 to about 70 dynes and preferably to between about 50 and 60 dynes. Obviously other combinations of incremental additions besides these two embodiments are prefectly feasible and will readily occur to those skilled in the art given these teachings. Thus, the short chain surfactant may be added in three increments, the first constituting 20% of the total and each of the other two 40% of the total, then the long chain reactant may be added in two equal increments; or the final increments of the short chain surfactant may be added concurrently with the initial increments of the "good" surfactant.

It is this combination of the choice of "poor" soaps and their incremental addition to the polymerization system which has made it possible to prepare very large particles of polymer of high molecular weight which exhibit very good particle size uniformity without elaborate reaction controls. While incremental surfactant addition has been employed before to obtain moderately uniform particles, elaborate control has been necessary as good soaps tend to generate non-uniform particle sizes. Good soaps easily exceed the CMC and therefore generate many particles which grow to a wide range of particle sizes. The poor soaps have been tried before, but unsuccessfully. They generate particles which grow to such large size that they precipitate or flocculate. The ability to use small quantities of these relatively cheap poor soaps and yet obtain stable latices by the process of the present invention is beneficial in polymer heat stability and water-sensitivity properties. The absence of large quantities of soap markedly improves stability.

As indicated above the term incremental is intended to include both continuous addition of the surfactant as well as slug additions. The rate of metered flow can be adjusted as desired and may in fact be set to change during the course of reaction.

The remaining components and conditions of the polymerization may be selected in accordance with standard practices in this art, depending on the monomers to be polymerized. Thus, particularly in the emulsion polymerization of vinyl halides, the initiator or catalyst is preferably a water-soluble peroxide or persulfate such as the alkali metal persulfates, i.e. potassium, sodium, lithium, rubidium and cesium persulfate, ammonium persulfate, morpholine persulfate, perborates, peracetates, urea peroxide, hydrogen peroxide, tertiary butyl hydroperoxide, ethylene diamine persulfate and alkanol amine persulfates. Redox systems have also been used to good effect, as well as the oil-soluble initiators, e.g. acetyl, benzoyl, lauroyl and succinyl peroxides. The polymerization reaction is conducted under usually accepted conditions of temperature and pressure, preferably in a range from about 35° to about 70° C., the optimum being from about 40° to 55°, using an autoclave at autogenous pressure. A buffer may be added to reduce or inhibit corrosion in the autoclave. There is no critical pH requirement. It is, however, necessary to provide the reaction chamber with suitable agitation, as is well known to those skilled in the art. If the agitation is insufficient, two phases result. If the agitation is too great, coagulation results. The degree of agitation is, of course, chosen dependent on the number of r.p.m.'s of the shaft, the type of blades used, and the configuration of the reaction kettle.

As previously indicated, the concept of incremental addition of the short carbon-chain "poor" surfactant to prepare latices of large particle size polymers is well adapted to a seed growth technique. The use of a preformed polymer particle as a growth site in emulsion polymerization is, in general, a well known technique in the art. In the normal procedures, a good surfactant, such as sodium lauryl sulfate, is used throughout the reaction in sufficient quantity to give mechanical stability to the growing polymer particles. Careful control of the amount of surfactant, relative to the amount of polymer in the latex, must be maintained throughout the reaction. While the good surfactant offers the desired mechanical stability, there is the danger of using too high a quantity for a given amount of polymer, giving an excess of surfactant in the latex. The presence of this excess surfactant leads to the formation of new polymer particles and the polymerization is, then, no longer a controlled seed growth.

This danger is overcome in the present invention by the incremental addition of a poor surfactant, as hereinbefore defined, which is substituted for at least a portion of the long-chain surfactant and eliminates the danger of new particle formation. The polyvinyl latex is first prepared in the presence of the requisite quantity of this poor soap. Then additional vinyl monomer is incorporated but no more surfactant is added at that time. This causes further polymerization on the polyvinyl particles originally formed, which thus function as seeds. Later in this "seeding" process more of the surfactant is added, then more monomer, and so on. Thus the short chain soap is added in small aliquots until at least about 20 percent completion of the reaction, and preferably until about 30 percent completion. At that point the surfactant is changed from a poor, i.e. 5 to 9 carbon chain, surfactant to a better surfactant, i.e. of 10 or more carbons.

In this way much more uniformly large particles are grown than by the prior art techniques hereinbefore described. Such particles are desirable in emulsions for the reasons described above. While these particles are not large in comparison to the 35 to 200 microns prepared by suspension processes, they are relatively large in comparison with those prepared by previously known emulsion techniques. At the same time particle size uniformity provides enhanced viscosity control and heat stability.

A plot of weight percent conversion of vinyl chloride versus time is shown for a typical seed run in FIG. 1. Initially, 5 percent of the vinyl chloride is present as polyvinyl chloride in the form of the seed material. Indicated on this plot is the addition of three types of surfactant. The type classification refers to the function performed by the surfactant as considered here, rather than to the chemical nature.

Type I surfactant.—In the early stages of the reaction a small amount of mechanical stability must be supplied by the surfactant to allow good agitation of the latex without flocculation of the polymer particles. Below 20 percent conversion, the solids content of the latex is quite low and therefore only a small amount of surfactant must be present.

Type II surfactant.—As the reaction proceeds, the amount of polymer increases and the amount of surfactant necessary to give the required mechanical stability increases. In this range (20–75 percent conversion) the amount of surfactant on each polymer particle must be increased over that permitted by the lower solids content of the early portion of the reaction.

Type III surfactant.—At 75 percent conversion no excess monomer is present in the reactor. At this point the remaining monomer is contained in the polymer particles and further reaction consumes this monomer, increasing the density of the polymer particles. A large amount of surfactant must be used from this point on to prevent flocculation without the danger of generating new particles.

The use of a good surfactant, such as sodium lauryl sulfate, in the early stages of the reaction (Types I and II surfactant) may easily lead to addition of an excess amount or a localized high concentration of surfactant. The maximum amount of surfactant that may be present at any time up to 75 percent conversion is about 60 percent of that amount necessary to reach the critical micelle concentration of that surfactant in a latex containing that given amount of polymer at that instant of the reaction. This amount of surfactant is distributed among the individual polymer particles and each would have a fractional surface coverage ($\phi$) equal to the amount of surfactant in the latex (Sa) minus the amount of excess necessary to reach the critical micelle concentration (cmc) in pure water (S'cmc) divided by the surfactant concentration at CMC in the given latex (Scmc), i.e. $\phi=(S_a-S'_{cmc})/S_{cmc}$. For sodium lauryl sulfate $S'_{cmc}=.1\%$ while for a poor surfactant such as sodium 2-ethylhexylsulfate $S'_{cmc}=1\%$.

By using a poor surfactant (sodium 2-ethylhexylsulfate, sodium heptanoate, etc.) as the Type I surfactant, the need for very precise control of surface coverage, $\phi$, is greatly eased without fear of generating new particles. For the Type II surfactant, either a small amount of good surfactant may be added or a large amount of a relatively poor soap, such as sodium 2-ethylhexylsulfate, may be used. In all cases it is best to use a relatively good surfactant as the Type III.

The following examples are given simply to illustrate this invention but not in any way to limit its scope.

EXAMPLE I

Initial charge:
    153 grams vinyl chloride monomer.
    16 grams (dry basis) of $0.3\mu$ seed as 35% solids latex.
    506.5 grams $H_2O$ (deionized).
    0.89 grams $(NH_4)_2S_2O_8$ initiator.
    0.22 gram $NaHCO_3$ buffer.

The above materials are charged to a 3-pint glass autoclave and stirred at 100 r.p.m. The mixture is heated to 45° C. throughout the reaction. The following additions are made to the reaction at the indicated times:

| Additive | Time interval, hour | Weight (dry basis), gram | Weight (wet basis), gram |
|---|---|---|---|
| (1) Sodium (2-ethylhexylsulfate) | 1.5 | 0.19 | 3.8 |
| (2) Sodium (2-ethylhexylsulfate) | 3 | 0.38 | 7.6 |
| (3) Sodium (2-ethylhexylsulfate) | 4 | 0.76 | 15.2 |
| (4) Vinyl chloride | 4 | 231 | |
| (5) Sodium (2-ethylhexylsulfate) | 5.5 | 0.76 | 15.2 |
| (6) Sodium lauryl sulfate | 7.33 | 0.76 | 15.2 |
| (7) Sodium dihexylsulfosuccinate and tetrasodium N-(1, 2-dicarboxyethyl)-N-octadecylsulfosuccinate | 8 | 1.2 | 12 |
| | 8 | 1.2 | 12 |

After the final surfactant addition the reaction is allowed to run to 85% conversion. The resulting polymer latex has an average particle size of 0.5 to $1\mu$ and a molecular weight of 117,000. This dispersion is easily spray-dried with no difficulties encountered due to mechanical instability.

EXAMPLE II

Initial charge:
    184 grams vinyl chloride.
    25 grams (dry basis) of $.3\mu$ seed as 37% solids latex.
    207.4 grams $H_2O$ (deionized).
    0.4 gram $(NH_4)_2S_2O_8$.
    0.1 gram $NaHCO_3$.

The reaction temperature is 47° C. for the first two hours, lowered to 45° C. for the remainder of the run. The above materials are handled as in Example I with the following additions made at the indicated times:

| Additive | Time interval, hour | Weight (dry basis), gram | Weight (wet basis), gram |
|---|---|---|---|
| (1) Sodium (2-ethylhexylsulfate) | 1 | 0.76 | 15.2 |
| (2) $H_2O$ (deionized): | | | 174.5 |
|   $(NH_4)_2S_2O_8$ | 2 | 0.4 | |
|   $NaHCO_3$ | | 0.1 | |
| (3) Sodium (2-ethylhexylsulfate) | 3 | 0.76 | 15.2 |
| (4) Sodium lauryl sulfate | 4 | 0.38 | 7.6 |
| (5) Sodium lauryl sulfate and vinyl chloride | 6 | 0.95 | 19 |
| | | 290 | |
| (6) Sodium lauryl sulfate | 8.5 | 0.95 | 19 |
| (7) Sodium lauryl sulfate | 11 | 0.95 | 19 |

The reaction is allowed to run to 100% completion after the last surfactant addition. The polymer contained in the latex has a molecular weight of 115,000 with an average particle size of $0.75\mu$ varying only from about 0.6 to $0.9\mu$. The latex remains a stable emulsion for over six months.

EXAMPLE III

The seeded reaction system and procedure of Example I is three times repeated with the same incremental additions, at temperatures of about 60° C. In the first case there is substituted for the vinyl chloride monomer a mixture of 60% by weight vinyl chloride and 40% vinyl acetate; in the second case there is substituted for the vinyl chloride monomer a mixture of 75% vinylidene chloride and 25% acrylonitrile; and in the third case a mixture of 90% vinyl chloride and 10% cetyl vinylether is used. In each instance a stable latex results with a remarkably large and uniform polymer particle size.

EXAMPLE IV

A standard autoclave of "pop bottle" is charged with the following materials (in parts by weight):

Vinyl Chloride—240.0.
Deionized $H_2O$—360.0.
Sodium heptanoate—0.9.
Ammonium persulfate—0.85.

The reactor is placed in a bottle bath at 45° C. and stirred for two hours at 20 r.p.m., after which another 0.9 part by weight of sodium heptanoate is added. The heating and stirring are then resumed for two more hours, whereupon a final 0.9 increment of the heptanoate is introduced (making a total of 1.13% of this "poor" surfactant based on the monomer charged). After three more hours of reaction (a total of seven), the vessel is cooled and vented. The latex thus obtained is treated with 0.3% by solids weight of sodium stearyl sulfate, after which it remains a stable emulsion for over six months. Molecular weight is 107,000 and polymer particle size ranges from 0.5 to $0.7\mu$.

When this procedure is repeated but omitting the third addition of sodium heptanoate, a polyvinyl chloride latex is obtained of $0.7\mu$ particle size $\pm 0.1\mu$ and 100,000 molecular weight.

EXAMPLE V

The following materials are reacted together in an autoclave at 30 r.p.m. and 50° C. for one hour (in parts by weight):

Vinyl chloride—256.0.
Water—365.0.
Sodium 2-methylhexanoate—0.5 (0.20% based on monomer).
$(NH_4)_2S_2O_8$—0.8.

At the end of one hour a second addition of 0.5 part by weight of the "poor" surfactant is made and the polymerization is continued for seven more hours. The resulting stable latex has PVC of molecular weight 112,000 and particle size $1.4-1.6\mu$.

When this procedure is repeated but doubling each of the two increments of the methylhexanoate (1 part by weight each time or 0.8% total), a vinyl chloride polymer is obtained of molecular weight 110,000 and average particle size $1.0\pm0.1\mu$.

EXAMPLE VI

The seeded reaction system and procedure of Example I are again employed with the same incremental additions but substituting for each charge of the sodium (2-ethylhexylsulfate) the same molar proportion of potassium isononyl sulfate. A particularly stable PVC latex of uniform particle size in the range of $0.8-1.0\mu$ is thus obtained.

The same process is again repeated, with comparable results, utilizing sodium alpha-methyl butyl sulfate as the short-chain emulsifying agent.

EXAMPLE VII

The following materials are reacted together at 25 r.p.m. and 45° C. in a standard autoclave for 30 minutes (in parts by weight):

Vinyl chloride—256.0.
Distilled water—372.0.
Sodium actyl sulfate dry "Dupanol 80"—0.5 (0.2% based on monomer).
Ammonium persulfate—0.7.

At the end of 30 minutes another addition of 0.2% of the surfactant is made; at the end of one more hour another 0.2% increment is added, and at the end of each of the next three hours another 0.2% increment is added, until a total of 1.2% by weight of the surfactant has been introduced incrementally and the polymerization has proceeded for a total of 4½ hours. The reaction is then stirred for 3 more hours until 98% conversion is realized. The stable latex (65 dynes surface tension) is then treated in one shot with sufficient "good" surfactant, i.e. about 0.5% by weight based on the monomer of sodium dodecylbenzene sulfonate, to reduce the surface tension to 45 dynes. This product is characterized by a uniform 0.3–0.4$\mu$ particle size, molecular weight 108,000, and an extended (more than six months) shelf life.

What is claimed is:

1. In the polymerization of an aqueous emulsion of at least 50% by weight of a vinyl monomer selected from the group consisting of vinyl halides, vinylidene halides and vinyl acetate, and mixtures thereof, the improvement which comprises effecting the polymerization in the presence of an effective amount of a first surfactant, as the principal emulsifying agent, which is an ammonium or alkali metal salt of an alkanoate containing between 5 and 9 carbon atoms, the said first surfactant being incrementally added to the reaction system during the course of the polymerization; then, adding to the system an effective amount of a second surfactant which is an ammonium or alkali metal salt of an alkyl or alkylene sulfate or sulfonate containing at least 10 carbon atoms.

2. The process of claim 1 wherein the addition of the first surfactant is carried out in more than one increment.

3. The process of claim 1 wherein the addition of the first surfactant is metered continuously to the reaction.

4. The process of claim 1 wherein the first surfactant is sodium heptanoate.

5. The process of claim 1 wherein the first surfactant is sodium 2-methyl hexanoate.

6. The process of claim 1 wherein the vinyl monomer is vinyl chloride.

7. The process of claim 1 wherein the vinyl monomer is a mixture of vinyl chloride and vinyl acetate.

8. The process of claim 1 wherein the second surfactant is sodium lauryl sulfate.

9. The process of claim 1 wherein the second surfactant is added after the polymerization has reached at least 20% completion.

10. The process of claim 1 wherein the first surfactant is present in amounts ranging between 0.2 and 2% by weight of monomer.

11. The process of claim 1 wherein the second surfactant is present in an amount ranging between 0.05 and 0.5% by weight of monomer.

References Cited

UNITED STATES PATENTS

| | | |
|---|---|---|
| 3,242,121 | 3/1966 | Hill. |
| 3,317,495 | 5/1967 | Jones et al. |
| 2,702,285 | 2/1955 | Bebb et al. |
| 3,297,666 | 1/1967 | MacPherson. |
| 3,316,199 | 4/1967 | Murphy. |
| 2,731,435 | 1/1956 | Johnson et al. |

MURRAY TILLMAN, Primary Examiner

W. J. BRIGGS, Sr., Assistant Examiner

U.S. Cl. X.R.

260—85.7, 87.1, 87.5, 91.7, 92.8